(12) United States Patent
Gregor

(10) Patent No.: US 10,727,615 B2
(45) Date of Patent: Jul. 28, 2020

(54) METHOD FOR CONNECTING A CONDUCTOR COMPRISING A BASE METAL TO A TERMINAL ELEMENT COMPRISING COPPER BY MEANS OF WELDING AS WELL AS A TERMINAL ASSEMBLY PRODUCED THEREBY

(71) Applicant: TE Connectivity Germany GmbH, Bensheim (DE)

(72) Inventor: Christian Gregor, Zwingenberg (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 15/834,630

(22) Filed: Dec. 7, 2017

(65) Prior Publication Data

US 2018/0109015 A1    Apr. 19, 2018

Related U.S. Application Data

(63) Continuation of application No. PCT/EP2016/062899, filed on Jun. 7, 2016.

(30) Foreign Application Priority Data

Jun. 8, 2015 (DE) ........................ 10 2015 210 458

(51) Int. Cl.
*H01R 4/62* (2006.01)
*H01R 4/02* (2006.01)
(Continued)

(52) U.S. Cl.
CPC ............. *H01R 4/625* (2013.01); *B23K 20/10* (2013.01); *B23K 20/2333* (2013.01);
(Continued)

(58) Field of Classification Search
CPC ........ H01R 4/625; H01R 4/021; H01R 4/028; H01R 4/187; H01R 4/023; H01R 43/02
(Continued)

(56) References Cited

U.S. PATENT DOCUMENTS 3,566,008 A * 2/1971 Louis ....................... H01R 4/62
174/94 R
3,656,092 A * 4/1972 Swengel, Sr. .......... H01R 4/029
439/730
(Continued)

FOREIGN PATENT DOCUMENTS

CN    103703865 A    4/2014
EP    2533365 A1    12/2012
(Continued)

OTHER PUBLICATIONS

Notification, The International Search Report and The Written Opinion of the International Searching Authority, dated Aug. 4, 2016, 11 pages.
(Continued)

*Primary Examiner* — Tulsidas C Patel
*Assistant Examiner* — Peter G Leigh

(57) ABSTRACT

A terminal assembly comprises a conductor including a base metal, a terminal element including copper, and a weld seam at which the terminal element is welded to the conductor. The weld seam has a layer including a copper alloy or of a mixture including copper and at least one base metal.

13 Claims, 4 Drawing Sheets

(51) Int. Cl.

| | | |
|---|---|---|
| *H01R 43/02* | (2006.01) | |
| *B32B 15/20* | (2006.01) | |
| *B23K 20/233* | (2006.01) | |
| *B23K 20/24* | (2006.01) | |
| *C23C 24/08* | (2006.01) | |
| *C23C 4/18* | (2006.01) | |
| *C23C 4/08* | (2016.01) | |
| *B23K 20/10* | (2006.01) | |
| *B23K 103/10* | (2006.01) | |
| *B23K 101/38* | (2006.01) | |
| *B23K 103/18* | (2006.01) | |
| *B23K 101/32* | (2006.01) | |
| *B23K 103/12* | (2006.01) | |

(52) U.S. Cl.
CPC .............. *B23K 20/24* (2013.01); *B32B 15/20* (2013.01); *C23C 4/08* (2013.01); *C23C 4/18* (2013.01); *C23C 24/08* (2013.01); *H01R 4/023* (2013.01); *H01R 43/02* (2013.01); *H01R 43/0207* (2013.01); *B23K 2101/32* (2018.08); *B23K 2101/38* (2018.08); *B23K 2103/10* (2018.08); *B23K 2103/12* (2018.08); *B23K 2103/18* (2018.08); *H01R 2201/26* (2013.01)

(58) Field of Classification Search
USPC .............. 439/874; 228/262.2, 262.51, 262.8, 228/262.9
See application file for complete search history.

(56) References Cited

U.S. PATENT DOCUMENTS

| | | | | |
|---|---|---|---|---|
| 4,317,277 A * | 3/1982 | Bennett | ................ | B23K 11/163 174/94 R |
| 4,998,432 A * | 3/1991 | Plessers | ............. | G01N 33/2025 73/19.07 |
| 5,300,755 A * | 4/1994 | Nishitani | ................ | B23K 26/22 219/121.63 |
| 5,808,260 A * | 9/1998 | Asakura | ................ | H01R 4/187 219/56.22 |
| 6,061,595 A * | 5/2000 | Safarevich | ................ | A61N 1/05 439/874 |
| 6,293,594 B1 * | 9/2001 | Safarevich | ................ | A61N 1/05 174/84 R |
| 6,538,203 B1 * | 3/2003 | Nolle | ................ | H01R 4/62 174/84 C |
| 6,759,594 B2 * | 7/2004 | Iijima | ................ | G01P 1/026 174/135 |
| 6,805,276 B2 * | 10/2004 | Wada | ................ | B23K 23/00 228/155 |
| 7,033,233 B2 * | 4/2006 | Fujimoto | ............. | B23H 11/006 439/874 |
| 7,084,346 B2 * | 8/2006 | Pabst | ................ | H01R 4/029 174/74 R |
| 7,374,466 B2 * | 5/2008 | Onuma | ................ | H01R 11/28 439/874 |
| 7,598,456 B2 * | 10/2009 | Mertel | ................ | C22C 21/00 174/84 R |
| 7,705,265 B2 * | 4/2010 | Asakura | ................ | H01R 43/0221 219/121.64 |
| 7,828,610 B2 * | 11/2010 | Lehmann | ................ | H01R 4/187 29/860 |
| 8,448,836 B2 * | 5/2013 | Schloms | ................ | B23K 20/10 228/110.1 |
| 8,840,437 B2 * | 9/2014 | Hentschel | ................ | H01R 4/029 439/874 |
| 9,225,076 B2 * | 12/2015 | Froeschl | ................ | H01R 4/023 |
| 9,837,732 B2 | 12/2017 | Rateiczak | | |
| 2001/0048020 A1 * | 12/2001 | Kuriyama | ................ | B23K 35/005 228/221 |
| 2002/0162683 A1 * | 11/2002 | Fujiwara | ................ | H01R 4/183 174/74 R |
| 2004/0004059 A1 * | 1/2004 | Oishi | ................ | H01R 43/0207 219/50 |
| 2008/0155823 A1 | 7/2008 | Heinzel et al. | | |
| 2011/0177727 A1 * | 7/2011 | Zhao | ................ | H01R 4/023 439/874 |
| 2013/0203303 A1 * | 8/2013 | Froeschl | ................ | H01R 4/023 439/874 |
| 2013/0206473 A1 * | 8/2013 | Gottschlich | .......... | H01R 4/5025 174/75 R |
| 2014/0008971 A1 * | 1/2014 | Hoffmann | ................ | H02P 25/22 307/9.1 |
| 2014/0110166 A1 | 4/2014 | Degen et al. | | |
| 2014/0144890 A1 * | 5/2014 | Dudziak | ............ | B23K 15/0093 219/121.64 |
| 2014/0182127 A1 * | 7/2014 | Kovacs | ................ | H01R 9/032 29/860 |
| 2014/0273667 A1 * | 9/2014 | Tachibana | ............ | H01R 43/048 439/877 |
| 2014/0287262 A1 * | 9/2014 | Kato | ................ | H01B 1/026 428/647 |
| 2015/0056852 A1 * | 2/2015 | Yamada | ............ | H01R 13/5213 439/528 |
| 2015/0064991 A1 * | 3/2015 | Kawamura | ............ | H01R 4/183 439/879 |
| 2015/0099406 A1 * | 4/2015 | Tsuge | ................ | H01R 4/023 439/874 |
| 2015/0111442 A1 * | 4/2015 | Miyamoto | ................ | H01R 4/62 439/874 |
| 2015/0126078 A1 * | 5/2015 | Kawamura | .......... | H01R 43/005 439/874 |
| 2015/0155673 A1 * | 6/2015 | Kawamura | ............ | H01R 43/02 29/860 |
| 2015/0357724 A1 * | 12/2015 | Okuno | ................ | C25D 7/00 29/879 |
| 2015/0357725 A1 * | 12/2015 | Matsuo | ................ | C22C 9/00 439/877 |
| 2015/0364837 A1 * | 12/2015 | Yagi | ................ | B23K 26/24 439/879 |
| 2016/0028177 A1 * | 1/2016 | Nomura | ................ | H01R 43/16 439/874 |
| 2016/0036155 A1 * | 2/2016 | Kataoka | ................ | H01R 13/405 439/736 |

FOREIGN PATENT DOCUMENTS

| | | |
|---|---|---|
| JP | H04-342159 A | 11/1992 |
| JP | H11-026672 A | 1/1999 |
| JP | 2002-283493 A | 10/2002 |
| JP | 2002-343336 A | 11/2002 |
| JP | 2007-277675 A | 10/2007 |
| JP | 2007-305314 A | 11/2007 |
| JP | 2010251067 A * | 11/2010 |
| JP | 2014-135203 A | 7/2014 |
| JP | 2014-527265 A | 10/2014 |

OTHER PUBLICATIONS

Chinese First Office Action with English translation, Chinese Patent Application No. 201680033296.4, dated Jul. 30, 2019, 16 pages.
Abstract of JP 2007-305314, dated Nov. 22, 2007, 1 page.
Abstract of JP 2002-343336, dated Nov. 29, 2002, 1 page.
Japanese Notice of Reasons for Refusal with English translation, Japanese Patent Application No. 2018-515355, dated Sep. 3, 2019, 10 pages.
Abstract of JP H11-026672 A, dated Jan. 29, 1999, 2 pages.
Abstract of JP 2002-283493 A, dated Oct. 3, 2002, 1 page.
Abstract of JP H04-342159 A, dated Nov. 27, 1992, 1 page.
Abstract of JP 2014-135203 A, dated Jul. 24, 2014, 1 page.
Abstract of JP 2007-277675 A, dated Oct. 25, 2007, 1 page.
Magome, Masakatsu, "JIS Manual Series, Thermal Spraying Technical Manual", Japanese Standards Association, Oct. 30, 1998, first edition, first printing, pp. 92-93.
Indian Examination Report, Application No. 201847000106, dated Nov. 22, 2019, 6 pages.

(56) References Cited

OTHER PUBLICATIONS

European Patent Office Communication, Application No. 16 728 668.1, dated Mar. 26, 2020, 6 pages.

* cited by examiner

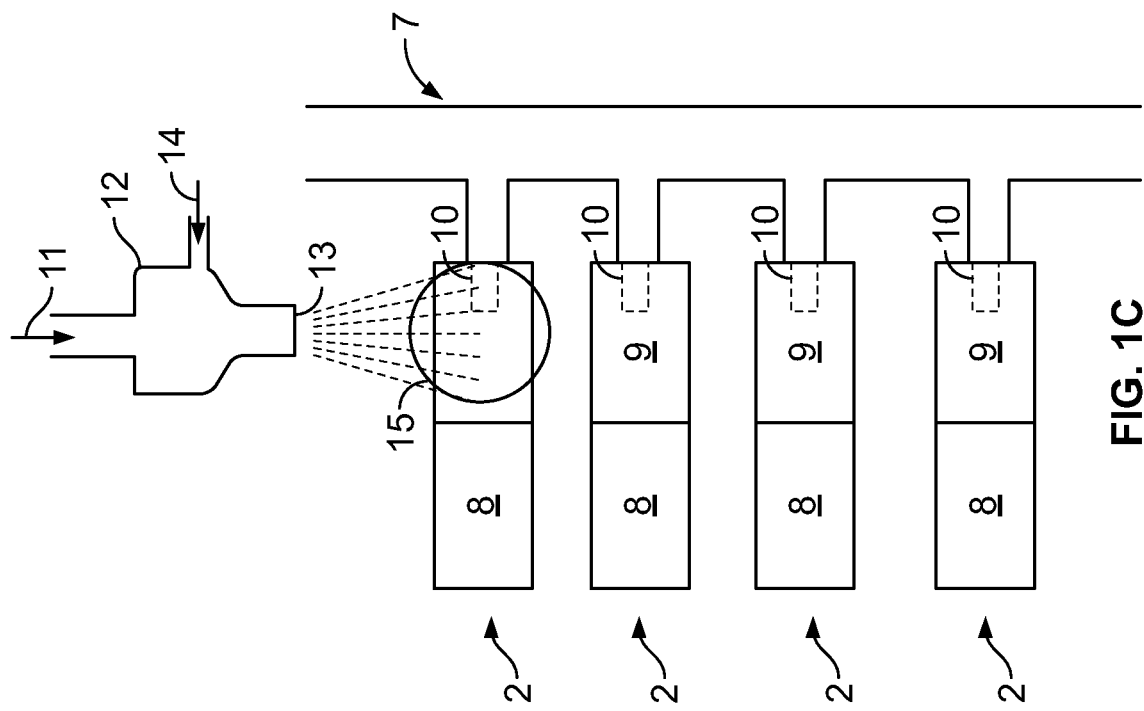
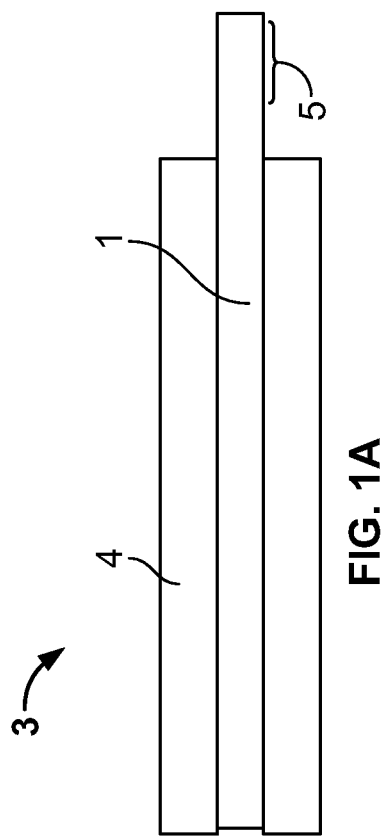
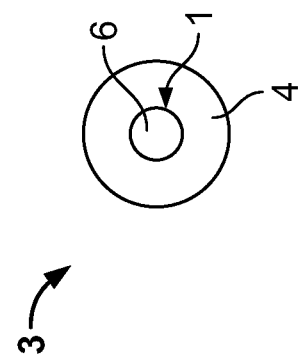
FIG. 1A
FIG. 1B
FIG. 1C

METHOD FOR CONNECTING A CONDUCTOR COMPRISING A BASE METAL TO A TERMINAL ELEMENT COMPRISING COPPER BY MEANS OF WELDING AS WELL AS A TERMINAL ASSEMBLY PRODUCED THEREBY

CROSS-REFERENCE TO RELATED APPLICATIONS

This application is a continuation of PCT International Application No. PCT/EP2016/062899, filed on Jun. 7, 2016, which claims priority under 35 U.S.C. § 119 to German Patent Application No. 102015210458.3, filed on Jun. 8, 2015.

FIELD OF THE INVENTION

The present invention relates to a terminal assembly and, more particularly, to a terminal assembly having a conductor comprising a base metal and a terminal element comprising copper connected to the conductor.

BACKGROUND

For weight and cost reasons, cable harnesses and plug-in connectors are increasingly being miniaturized in the automotive industry. The cable harnesses and the terminal elements in plug-in connectors are traditionally produced from copper or a copper alloy. However, copper is very heavy and is relatively expensive. The automotive industry is increasingly focusing on alternative conductor materials which are lighter and more economical than copper, for example conductors made of base metals.

When connecting conductors comprising a base metal to a terminal element which comprises copper, however, it is difficult to produce a reliable mechanical and electrical connection. Mechanically connecting a conductor and a terminal assembly which consist of different metals or metal alloys is problematic, in particular in view of the strict requirements set for plug-in connectors in the automotive industry. These are exposed to high physical stresses and therefore have to withstand high forces. Further, the connection of a terminal element comprising copper to a conductor comprising a base metal is electrochemically problematic because the point of contact of copper to the base metal is at risk of corrosion. Corrosion not only weakens the mechanical connection, but also makes it difficult to transport charge if the oxide layer formed is insulating.

SUMMARY

A terminal assembly according to the invention comprises a conductor including a base metal, a terminal element including copper, and a weld seam at which the terminal element is welded to the conductor. The weld seam has a layer including a copper alloy or of a mixture including copper and at least one base metal.

BRIEF DESCRIPTION OF THE DRAWINGS

The invention will now be described by way of example with reference to the accompanying Figures, of which:
FIG. 1A is sectional side view of an electrical wire;
FIG. 1B is a sectional end view of the electrical wire;
FIG. 1C is a plan view of a plurality of terminal elements.

DETAILED DESCRIPTION OF THE EMBODIMENT(S)

Figure 2:
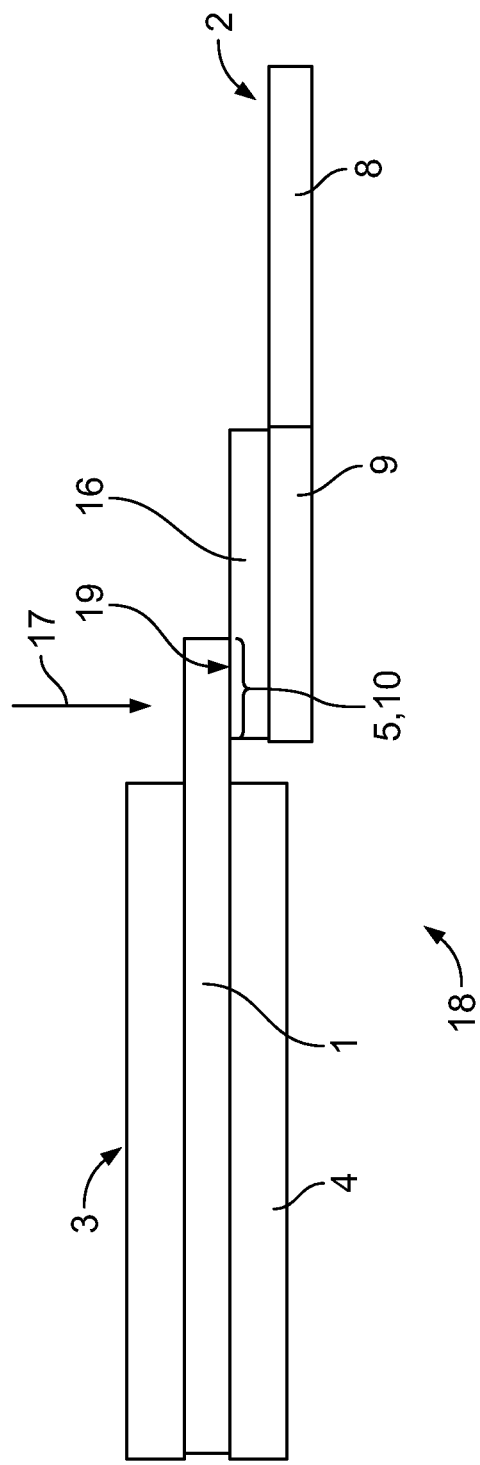
FIG. 2 is a sectional side view of a terminal assembly including the electrical wire connected to a terminal element.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

In the following description, "base metal" should be understood to be all metals which have, in the electrochemical voltage series, a standard electrode potential which is smaller than the standard electrode potential of hydrogen. "Welding" should be understood to mean the permanent connection of components by applying heat and/or pressure. A "coating" is the application of a firmly adhering layer of formless material onto the surface of a carrier material; the layer which arises is the "coating".

A terminal assembly 18 according to the invention is shown in FIG. 2. The terminal assembly 18 includes an electrical conductor 1 and a terminal element 2 connected to the electrical conductor 1.

The conductor 1, as shown in FIGS. 1A, 1B, and 2, is part of an electrical wire 3 and is disposed in an insulating cover 4. At one end, the cover 4 of the electrical wire 3 is removed so that the conductor 1 is exposed at this end. A region of the exposed conductor 1 which is adapted to be welded to the terminal element 2, as described below, is a conductor weld joint 5. In an embodiment, the conductor 1 is aluminum. The conductor 1 can consist of aluminum or an electrically conductive aluminum alloy. The conductor 1 has a round conductor cross-section 6, shown in FIG. 1B, between 5 and 120 mm². In other embodiments, the conductor cross-section 6 is between 6 and 80 mm² or between 30 and 40 mm². In other embodiments, the conductor 1 can have any n-sided cross-section, such as an oval or any other cross-section.

A pre-stamped strip 7 shown in FIG. 2B has a plurality of terminal elements 2 which have been stamped out of a single metal sheet. Each terminal element 2, as shown in FIGS. 1C and 2, has a contact section 8 and a terminal section 9. The contact section 8 is the region with which the terminal element 2 is later electrically contacted by a mating plug element, for example as a part of an electrical plug connector. The terminal region 9 is the part with which the terminal element 2 is connected to the conductor 1. The terminal region 9 comprises a terminal weld joint 10 at which the terminal element 2 is welded to the electrical conductor 1.

The terminal element 2 comprises copper and can, for example, be a contact element of a plug-in connector. In order to improve the welding of the terminal element 2 comprising copper to the conductor 1 comprising a base metal, a layer made up of a copper alloy or a mixture comprising copper and at least one base metal is applied at least at a weld joint 5, 10, before the conductor 1 and the terminal element 2 are welded together. In an exemplary embodiment, the terminal element 2 is coated; the terminal section 9 of the terminal element 2 is coated at least in sections, in particular in the region of the terminal weld joint 10.

The coating process is shown in FIG. 1C. A solid coating material 14 is applied. In an embodiment, the coating material 14 is a powder having a particle size up to 60 μm. In other embodiments, the particle size may be 1 to 50 μm or 1 to 35 μm. The coating material 14 can be applied by thermal spraying; in the embodiment shown, the coating material 14 is applied by cold gas spraying. For this purpose, a gas jet 11 is introduced into a spray nozzle 12, heated up in the spray nozzle 12, accelerated and pressed out through the nozzle outlet 13. The coating material 14 is injected into the gas jet 11 as a solid, for example, as a powder. The injected spray particles are accelerated in the gas jet 11 and applied onto the terminal section 9 of a terminal element 2 at a high speed. In this manner, a coating zone 15, within which the spray particles are applied onto the substrate, can be restricted to the desired regions of the terminal element 2. A layer is formed by the spray particles being flattened when they impact on the terminal section 9 and mainly remain adhered by mechanical clamping. The gas jet 11 is in this case generally heated, depending on the method, to temperatures at which the spray particles in the gas jet 11 can be fused, surface-fused, or joined by fusing.

A coating by cold gas spraying, as in the shown embodiment, can be performed continuously. To do so, for example, the coating zone 15 of the nozzle 12 can be guided successively over the terminal weld joints 10 in the pre-stamped strip 7. Alternatively, the coating zone 15 of the nozzle 12 could be stationary and the individual terminal elements 2 within a strip 7 can be successively guided through the coating zone 15.

The coating material 14, in an embodiment, has a mixture comprising copper and at least one base metal. The base metal of the mixture can, for example, be selected from the group comprising zinc, aluminum, tin, iron, nickel, manganese, and oxides of the aforementioned metals. In an embodiment, the coating material 14 is a mixture having alumina powder, zinc powder and copper powder. Such a mixture forms a well-adhering coating on a terminal element 2 as a carrier material.

Figure 3:
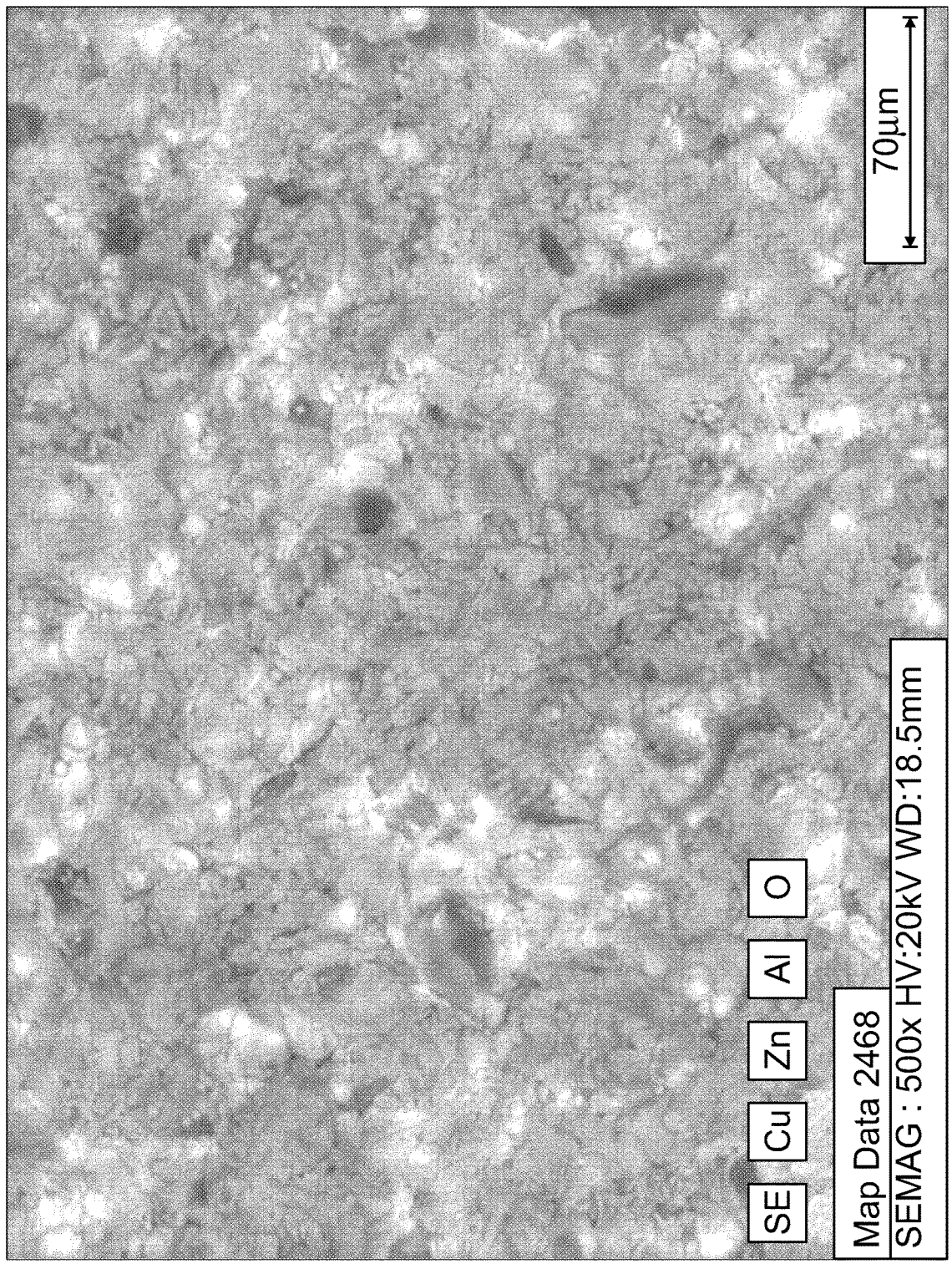
FIG. 3 is an image of a surface of a coating according to an embodiment.

FIG. 3 shows a scanning electron microscope image of a coating 14 of a mixture made up of 40% zinc powder (purity 96%), 30% alumina powder (purity 99.4%) and 30% copper powder (purity 99.5%). As shown in FIG. 3, both copper and the base metals zinc and aluminum are contained and uniformly distribute in the coating 14.

Figure 4:
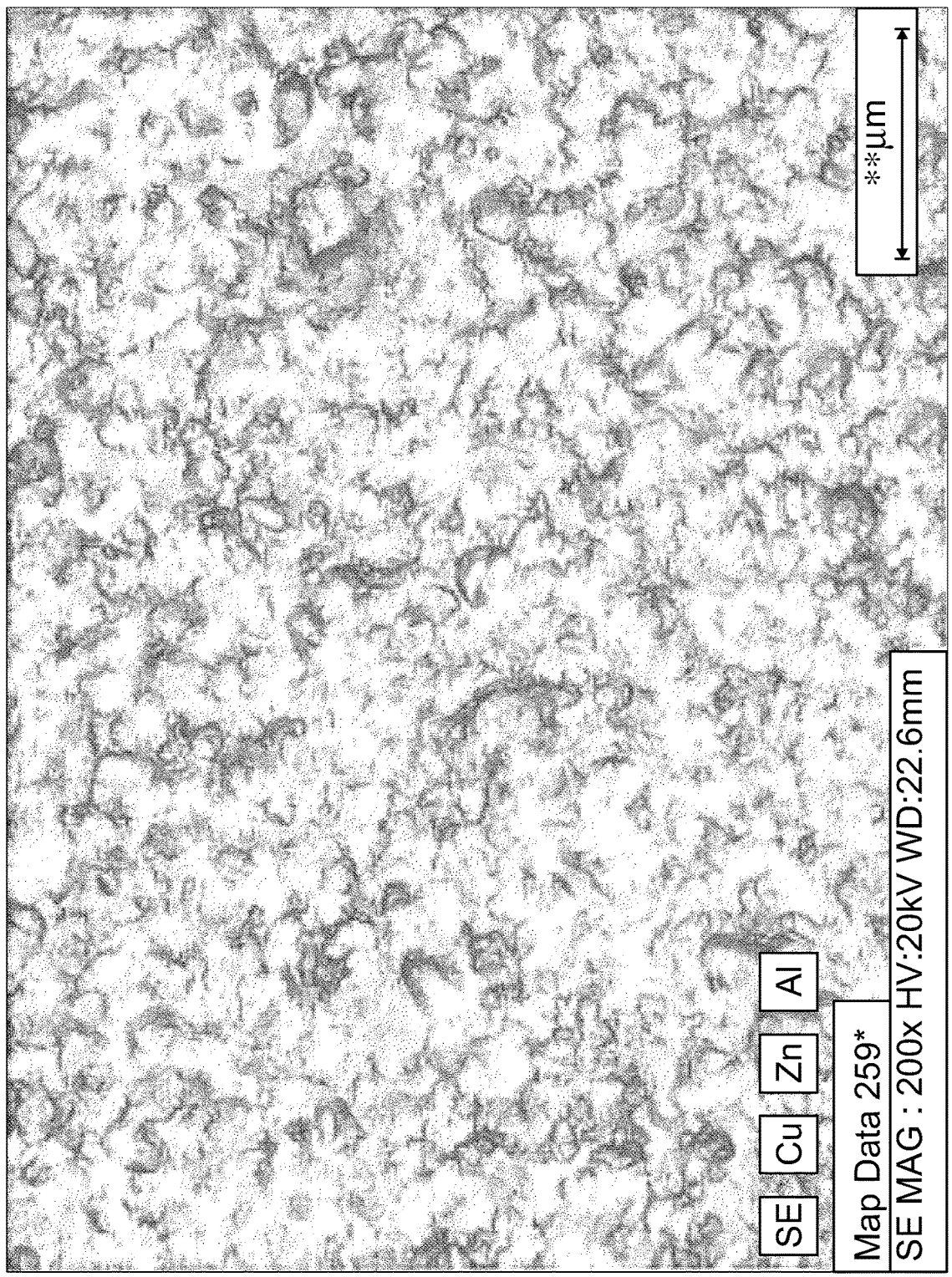
FIG. 4 is an image of a surface of a coating according to another embodiment.

An alternative coating 14 is shown in the scanning electron microscope image in FIG. 4, in which the powder of a brass alloy was applied by cold gas spraying onto a terminal element 2 having CuSn 0.15 base material. In an exemplary embodiment, the brass powder has a copper content of 70%, a zinc content of 30% and has a particle size smaller than <32 μm. As shown in FIG. 4, both copper and zinc are uniformly distributed in the coating 14 and are applied on the carrier in a well adhering manner. In other embodiments, the zinc content of the brass can be between 10 and 70%, between 20 and 40%, or between 28 and 32%. Instead of brass, it is also possible to use any desired other copper alloy comprising copper and a base metal. For example, a copper alloy selected from the group comprising CuSn, CuZnxSny, CuFe, CuNiSi, CuAlxy can be applied. If coating takes place with brass, the applied brass can have lead or at least one further alloy element. The at least one further alloy element can be selected from the group of aluminum, iron, manganese, nickel, silicon and tin.

After the copper alloy or the mixture has been applied as the coating 16 at least at the conductor weld joint 5 at the conductor 1 and/or at the terminal weld joint 10 at the terminal element 2, the conductor weld joint 5 and the terminal weld joint 10 are brought together and the conductor 1 and the terminal element 2 are welded there. The welding process is shown schematically in FIG. 2 by an arrow 17.

After welding, a terminal assembly 18 shown in FIG. 2 is formed, a weld seam 19 of which has a layer of a copper alloy, or of a mixture comprising copper, and at least one base metal. The conductor 1 and the terminal element 2 can be friction-welded, for example welded by means of ultrasonic welding. For this purpose, a mechanical ultrasonic vibration is generated in the high-frequency range, generally from 20 to 35 kHz, and is introduced into the joining partners, in this case the conductor 1 and the terminal element 2. The high-frequency mechanical vibration leads to heating by boundary friction and results in a serration and hooking of the joining partners. As a result, a mechanically reliable connection can be generated between a conductor 1 comprising a base metal, for example aluminum, and a terminal element 2 comprising copper. The weld connection according to the invention is more reliable and capable of withstanding higher tractive and peeling forces than is the case with a direct welding without the coating according to the invention.

By coating with a copper alloy or with a mixture comprising copper and at least one base metal, a connecting layer is applied at the weld seam 19. This connecting layer improves the connection of the conductor 1 to the terminal element 2 both mechanically and in terms of electrical conductivity. The coating protects the region of the conductor 1 which is connected to the terminal element 2 from the formation of an insulating corrosion layer which impedes the electron transport across the surface as a conductor current from the conductor 1 onto the terminal element 2. The base metal is present together with copper in the applied coating, either in a mixture or a copper alloy, such that corrosion occurs, if at all, at most partially and not across the surface. Furthermore, the coating improves the mechanical connection between the conductor 1 and the terminal element 2 by improving the suitability for welding and the weld connection quality.

What is claimed is:

1. A terminal assembly, comprising:
    a conductor including a base metal;
    a terminal element including copper, the terminal element having a layer of a coating in an unwelded state; and
    a weld seam at which the terminal element is welded to the conductor, the weld seam having a portion of the layer of coating including a copper alloy in a welded state, or of a mixture including copper and at least one base metal in a welded state.

2. The terminal assembly of claim 1, wherein the conductor includes aluminum.

3. The terminal assembly of claim 2, wherein the conductor consists of aluminum or an aluminum alloy.

4. The terminal assembly of claim 1, wherein the conductor has a conductor cross-section of 5 to 120 mm$^2$.

5. The terminal assembly of claim 4, wherein the conductor cross-section is 6 to 80 mm$^2$.

6. The terminal assembly of claim 5, wherein the conductor cross-section is 30 to 40 mm$^2$.

7. The terminal assembly of claim 1, wherein the mixture has at least one base metal selected from the group consisting of zinc, aluminum, tin, iron, nickel, manganese and oxides of the aforementioned metals.

8. The terminal assembly of claim 1, wherein the copper alloy is a powder selected from the group consisting of CuSn, CuZnxSny, CuFe, CuNiSi, CuAlxy and brass.

9. The terminal assembly of claim 8, wherein the copper alloy is brass and a zinc content of the brass is between 10% and 70%.

10. The terminal assembly of claim 9, wherein the zinc content of the brass is between 20% and 40%.

11. The terminal assembly of claim 10, wherein the zinc content of the brass is between 28 and 32%.

12. The terminal assembly of claim 9, wherein the brass includes lead and/or at least one further alloy element.

13. The terminal assembly of claim 12, wherein the at least one further alloy element is selected from the group consisting of aluminum, iron, manganese, nickel, silicon and tin.

* * * * *